UNITED STATES PATENT OFFICE.

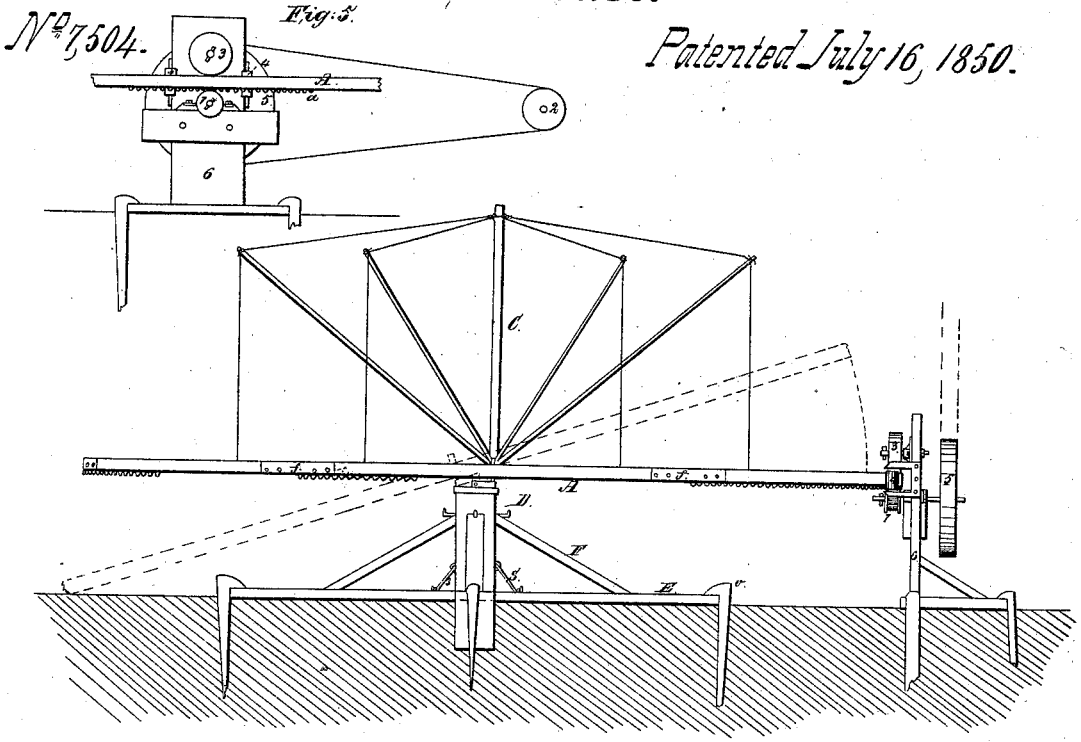
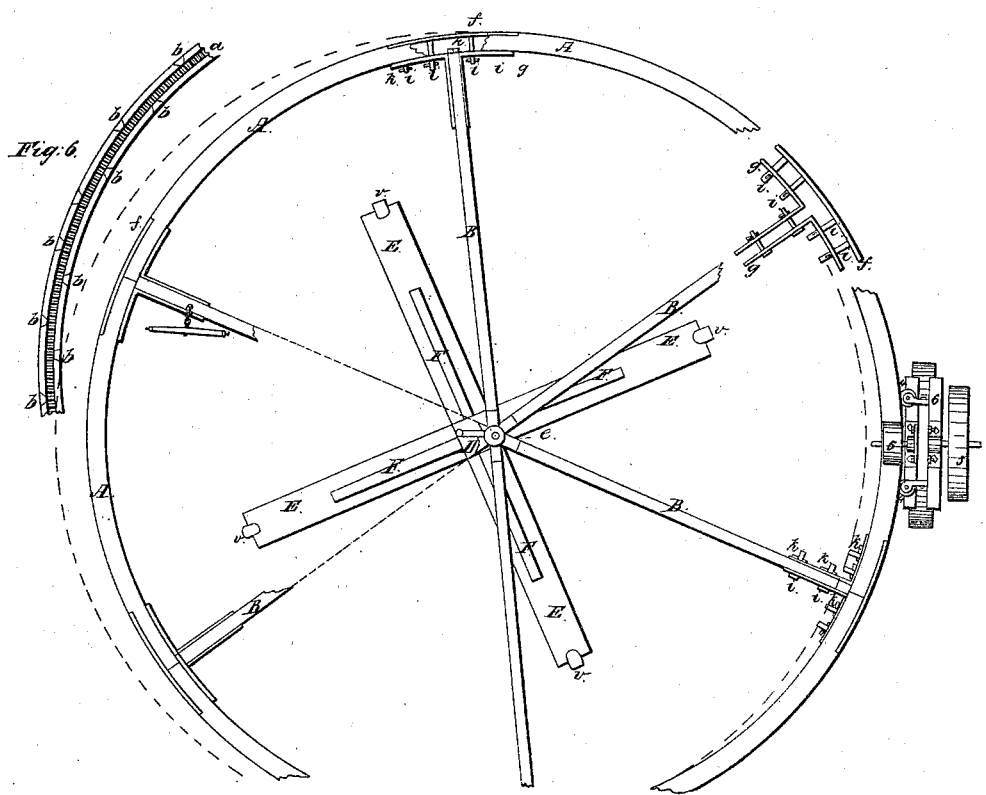

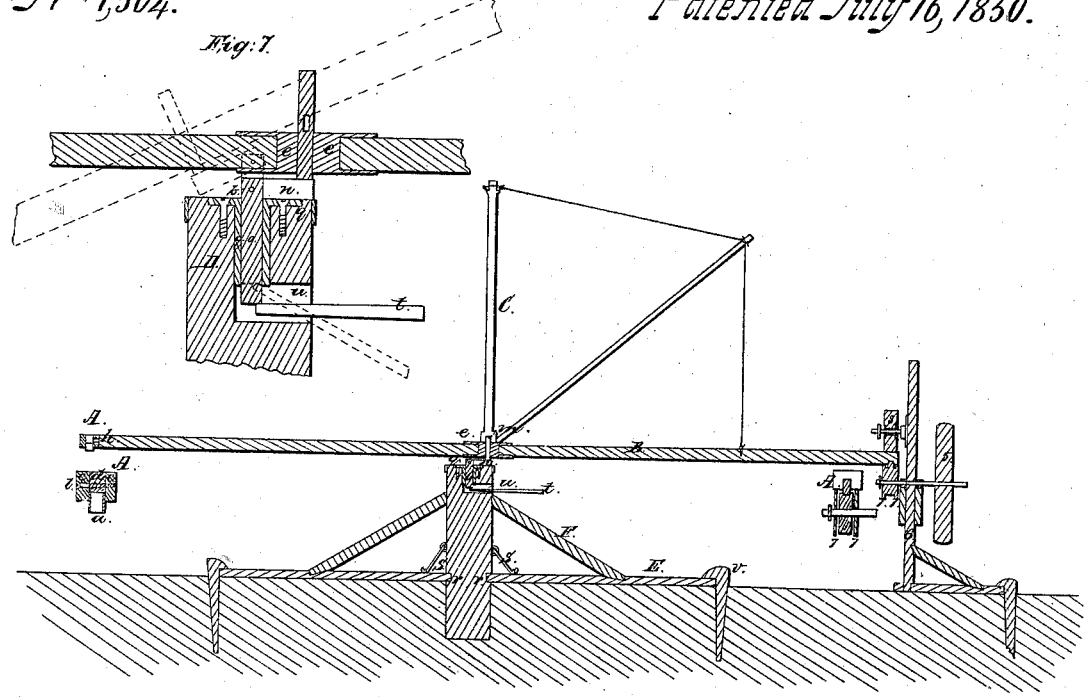
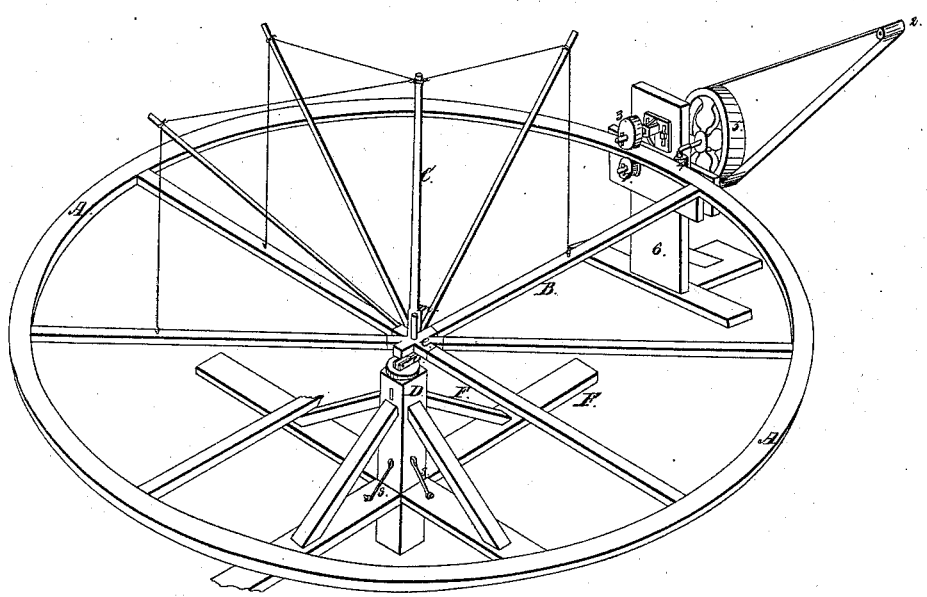

J. L. CATHCART, OF WASHINGTON, DISTRICT OF COLUMBIA.

HORSE-POWER.

Specification of Letters Patent No. 7,504, dated July 16, 1850.

*To all whom it may concern:*

Be it known that I, J. L. CATHCART, of Washington, in the county of Washington, in the District of Columbia, have invented certain Improvements in Horse-Powers, and that the following is a full, clear, and exact description of the principle or character which distinguishes therefrom all other things before known and of the usual manner of making, modifying, and using the same, reference being had to the accompanying drawings, of which—

Figure 1, is an elevation Fig. 2 a plan Fig. 3 a section Fig. 4 a perspective view, Fig. 6 a plan of the underside of the rim of the wheel, Fig. 5 a section of pinion, friction rollers &c. and Fig. 7, an enlarged section of the center pivot, &c.

My invention consists in improvements in horse powers for general agricultural uses, which combine the qualities of strength, portability, lightness and durability in an eminent degree, as well as great facility for setting up and taking to pieces for transportation from place to place; and also an arrangement by which the horses can be taken in and out, and the arms and rim while at work be at that height from the ground which is the best for the attachment of the traces in the proper line of draft.

The rim (A) and the arms (B) are supported on a pivot in a center post (D) the arms being braced by iron rods, connected with a short mast (C) over the center. The center post (D) is set part way into the ground and is atatached to the foot pieces (E) the ends of which, set in notches in (D) and are held in place by the hooks (s) and the braces (F) and can be taken to pieces, and set up again in a very short space of time.

On top of the post (D) is a socket (q) see Fig. 7, in which is the piece (o) which is jointed at (p) on its upper end to the piece (n) in which is set the pivot (m). (n) is a mortise in the post (D) for the insertion of a lever, by which the piece (o) can be raised, which allows the pivot (m) together with the entire wheel to be thrown into the position, represented in the drawing and colored blue. The pivot (m) is placed eccentrically so that when turned round the rim of the wheel is disengaged from the pinion (1) and the wheel can be tilted up, so that the horses can walk in or out from between the arms, to which their traces are attached while working. The wheel being of such a light construction is easily shifted so as to bring the pivot to the opposite side of the center and by the insertion of the lever (t) into the mortise in (D) the pivot is raised so as to allow of the wheel being tilted up with ease.

The rim (A) is formed of three circles of wood in segments, and between the two circles (c c) beneath the circle (d) see Fig. 3, are the cogged segments (a) forming when together a toothed circle, which meshes in which the pinion (1). The segments (a) are cast with dovetail projections (b) which connect them with the wooden circles and bind the whole together. The circles are also held together by the screws (l).

(e) is the center of the wheel working on the pivot (m) having sockets for the insertion of the arms (B) which at their outer ends are connected with the rim (A) by the angle irons (g) and the plates (f) which are bolted together by the bolts (i) and the keys (k) and admit of being taken to pieces with the greatest ease.

Upon the shaft of the pinion (1) on each side of the pinion, small wheels (7) which run loose on the shaft, are placed, their rims projecting above the cogs of the pinion. These serve as anti-friction wheels and bear up the rim and prevent its weight from pressing on the pinion (1). Above the rim over the pinion is the anti-friction wheel (3) which keeps the rim (A) down and in gear with the pinion (1). (4, 4,) are two rollers which guide the rim (A). (5) is the band wheel on the shaft of the pinion (1) for driving the machinery. (6) is the standard to which the running gear is attached. The several parts are held firm in their places by the pins (v) driven into the ground.

Having thus fully described my improvements in horse powers, what I claim and desire to secure by Letters Patent, is—

The eccentric pivot which by being turned round allows the entire wheel to be withdrawn from the pinion and when raised by the lever (t) the wheel can be tilted up for the purpose of taking the horses in or out, substantially as set forth.

JAS. L. CATHCART.

Witnesses:
EDWARD EVERETT,
WM. GREENOUGH.